(12) United States Patent
Ingram et al.

(10) Patent No.: US 11,440,272 B2
(45) Date of Patent: Sep. 13, 2022

(54) IMPREGNATED VEILS

(71) Applicant: Magna Exteriors Inc., Concord (CA)

(72) Inventors: John A. Ingram, Richmond Hill (CA); David A. Calder, Guelph (CA); Daniel P. McNulty, Elora (CA); Paul A. Trudeau, Guelph (CA); Henry E. Moore, Guelph (CA)

(73) Assignee: Magna Exteriors Inc., Concord (CA)

( * ) Notice: Subject to any disclaimer, the term of this patent is extended or adjusted under 35 U.S.C. 154(b) by 1094 days.

(21) Appl. No.: 16/061,612

(22) PCT Filed: Dec. 14, 2016

(86) PCT No.: PCT/IB2016/057632
§ 371 (c)(1),
(2) Date: Jun. 12, 2018

(87) PCT Pub. No.: WO2017/103823
PCT Pub. Date: Jun. 22, 2017

(65) Prior Publication Data
US 2020/0307123 A1     Oct. 1, 2020

Related U.S. Application Data

(60) Provisional application No. 62/266,987, filed on Dec. 14, 2015.

(51) Int. Cl.
*B29C 70/34* (2006.01)
*C08J 5/04* (2006.01)
(Continued)

(52) U.S. Cl.
CPC .............. *B29C 70/34* (2013.01); *B29C 70/08* (2013.01); *C08J 5/042* (2013.01); *C08J 5/043* (2013.01);
(Continued)

(58) Field of Classification Search
CPC ................................. B29C 70/08; B29C 70/34
See application file for complete search history.

(56) References Cited

U.S. PATENT DOCUMENTS 9,180,627 B2    11/2015  Masini
2005/0236736 A1    10/2005  Formella et al.
(Continued)

FOREIGN PATENT DOCUMENTS

CN    104136203 A    11/2014
EP    1588838 A1    10/2005
(Continued)

OTHER PUBLICATIONS

Search Report from Application No. CN201680072827 dated Jan. 20, 2020.
(Continued)

*Primary Examiner* — Kregg T Brooks
(74) *Attorney, Agent, or Firm* — Warn Partners, P.C.

(57) ABSTRACT

Impregnated veil and compression molding process of reinforcing fiber pre-impregnated continuous and discontinuous thermoset and thermoplastic materials. Veils are incorporated within the process, filming or laminating stages of the pre-pregging, either hotmelt or solvent based processes, in a variety of chosen resins. The veils help to improve visual part quality, reduce fiber splitting, and provide an isolating material in applications where incompatible materials must exist.

10 Claims, 3 Drawing Sheets

(51) Int. Cl.
*C08J 5/24* (2006.01)
*B29C 70/08* (2006.01)
*B29K 33/00* (2006.01)
*B29K 67/00* (2006.01)
*B29K 707/04* (2006.01)
*B29K 709/08* (2006.01)

(52) U.S. Cl.
CPC .............. *C08J 5/046* (2013.01); *C08J 5/24* (2013.01); *B29K 2033/08* (2013.01); *B29K 2067/00* (2013.01); *B29K 2707/04* (2013.01); *B29K 2709/08* (2013.01); *C08J 2333/08* (2013.01); *C08J 2367/00* (2013.01)

(56) References Cited

U.S. PATENT DOCUMENTS

| | | | |
|---|---|---|---|
| 2005/0255311 A1* | 11/2005 | Formella | B29C 70/547 428/323 |
| 2005/0255766 A1 | 11/2005 | Kruger et al. | |
| 2010/0051183 A1* | 3/2010 | Boke | B29C 66/8322 156/228 |
| 2010/0136316 A1 | 6/2010 | Kwag et al. | |
| 2011/0159764 A1 | 6/2011 | Price et al. | |
| 2011/0210476 A1 | 9/2011 | Difonzo et al. | |
| 2011/0294387 A1 | 12/2011 | Simmons et al. | |
| 2012/0114899 A1 | 5/2012 | Ellis | |
| 2014/0011414 A1 | 1/2014 | Kruckenberg et al. | |
| 2014/0287638 A1* | 9/2014 | Hadley | C08J 5/04 442/32 |
| 2014/0378582 A1 | 12/2014 | Masini | |
| 2016/0332389 A1* | 11/2016 | Tachon | B29C 70/083 |
| 2016/0346959 A1 | 12/2016 | Corden et al. | |
| 2018/0311912 A1* | 11/2018 | Restuccia | B32B 5/022 |

FOREIGN PATENT DOCUMENTS

| | | |
|---|---|---|
| GB | 2481528 A | 12/2011 |
| WO | 9202410 A1 | 2/1992 |
| WO | 2015113585 A1 | 8/2015 |

OTHER PUBLICATIONS

International Search Report for International Application No. PCT/IB2016/057632, dated Mar. 16, 2017.

* cited by examiner

Example 4 Layup

| | Ply Orientation | FAW (gsm) | RAW (gsm) |
|---|---|---|---|
| 1 | 12 gsm polyester | Veil | 12 | 12 |
| 2 | | 0 | 190 | 125 |
| 3 | 12 gsm polyester | Veil | 12 | 12 |
| 4 | | 90 | 190 | 125 |
| 5 | | 0 | 190 | 125 |
| 6 | | 0 | 190 | 125 |
| | | 90 | 190 | 125 |
| | | 0 | 190 | 125 |

Example 5 Layup

| | Ply Orientation | FAW (gsm) | RAW (gsm) |
|---|---|---|---|
| 1 | | 0 | 125 | 125 |
| 2 | 12 gsm polyester | Veil | 12 | 12 |
| 3 | | 90 | 190 | 125 |
| 4 | | 0 | 190 | 125 |
| 5 | | 0 | 190 | 125 |
| 6 | | 90 | 190 | 125 |
| | | 0 | 190 | 125 |

Example 6 Layup

| | Ply Orientation | FAW (gsm) | RAW (gsm) |
|---|---|---|---|
| 1 | 12 gsm polyester | Veil | 12 | 12 |
| 2 | | 0 | 190 | 125 |
| 3 | 12 gsm polyester | Veil | 12 | 12 |
| 4 | | 90 | 190 | 125 |
| 5 | | 0 | 190 | 125 |
| 6 | 12 gsm polyester | Veil | 12 | 12 |
| | | 0 | 190 | 125 |
| | | 90 | 190 | 125 |
| | | 0 | 190 | 125 |
| | 12 gsm polyester | Veil | 12 | 12 |

Example 7 Layup

| | Ply Orientation | FAW (gsm) | RAW (gsm) |
|---|---|---|---|
| 1 | 12 gsm polyester | Veil | 12 | 12 |
| 2 | | 0 | 190 | 125 |
| 3 | | 90 | 190 | 125 |
| 4 | | 0 | 190 | 125 |
| 5 | | 0 | 190 | 125 |
| 6 | | 90 | 190 | 125 |
| | | 0 | 190 | 125 |
| | 12 gsm polyester | Veil | 12 | 12 |

*FIG - 4*

IMPREGNATED VEILS

CROSS-REFERENCE TO RELATED APPLICATIONS

This application is a National Stage of PCT International Application No. PCT/IB2016/057632filed Jun. 14, 2017 which claims the benefit of U.S. Provisional Patent Application No. 62/266,987, filed Dec. 14, 2015. The disclosures of the above applications are incorporated herein by reference.

FIELD OF THE INVENTION

The present invention relates to veil layer(s) incorporated in pre-impregnated materials for compression molding in the manufacture of parts such as automotive parts.

BACKGROUND OF THE INVENTION

Molding of various plastic materials is a common method used to create parts for various applications. Traditionally, carbon fiber composites have known surface issues for fiber lines and resin rich domains on the surface causing post-mold reworking of parts to meet appearance and quality standards. Defects include visible fiber read through on painted surfaces, especially with resin rich domains on the surface. At higher temperatures, such as during compression molding, the coefficient of linear thermal expansion differential within the substrate increases the read through visibility since the resin will expand and the carbon fiber will contract at elevated temperatures. Resin rich domains are typically caused by splitting of pre-preg during the compression molding process (e.g, split fiber bundles). "Pre-preg" is generally reinforced material pre-impregnated with a resin.

The use of impregnated sheets for forming molded parts has been done in the past. However, currently, composite suppliers supply dry and impregnated veils, but not assembled in the inventive fashion of this subject application or used for the new manufacturing process for carbon fiber continuous pre-impregnated materials, as set forth in this present application.

One common problem is being able to provide out-of-the-mold Class "A" surfaces ready for paint (all carbon processes require surface preparation work to make them ready for Class A). Surface and preparation and rework of carbon fiber is expensive and adds to the cost prohibitive nature of articles molded in this material for automotive. In addition, material, part geometry, and the process can create additional defects in the subject unique compression molding process.

A typical known compression molding process includes a pre-preg kit stack-up of plies, where each ply has a 0° ply orientation or 90° ply orientation. Some systems also include dry veils, which have significant disadvantages such as not being acceptable for three dimensional parts (3D), etc. The prepreg stack up is cut into a flat 2-dimensional (2D) pre-preg blank. The pre-preg blank is preformed into the general shape of the desired part and placed on core tooling. Cavity tooling closes on the blank in the core tooling and a clamp force (i.e., 900-11000 kN) is applied as the tools are at a heated temperature range (i.e., 150° C.) to form the part.

However, if the integrity of the pre-preg is weak then splits will develop when the clamp force is applied. These splits will also align with fiber orientation on the top ply. Fiber bridging and stress within the pre-preg laminate is compounded in areas where there are significant changes in part geometry, especially with vertical walls and sharp radii. This results in increased read through in these areas. In general, the worse the pre-preg quality, the worse the resin rich domain and resulting read through—especially in areas with more complex geometries. Another problem is that when heat is applied during compression, fiber washout results and splits will separate even further. In addition, when a commercial carbon fiber material (e.g., such as 50K continuous carbon fiber tow, etc) has variations in tow mass to begin with, this affects the fiber spreading and ability to interlace fiber bundles within the pre-preg. Poor fiber interlacing can result in splits or otherwise compromise pre-preg integrity.

Accordingly, there exists a need for an improved ply layup and method of manufacturing parts which produces a better surface out of the tool, that requires less surface preparation and rework to meet automotive Class A requirements, and which reduces surface preparation and costs associated with current processing.

SUMMARY OF THE INVENTION

The present invention generally relates to incorporation of impregnated veils and a compression molding process of pre-impregnated carbon fiber. There is provided impregnated veil(s) for use in the compression molding process of carbon fiber pre-impregnated continuous and/or discontinuous thermoset and thermoplastic materials. These veils are incorporated within the filming or laminating stages of the pre-pregging (either hotmelt or solvent based processes) in a variety of resins such as epoxy, polyurethane, polyester, vynyl ester, nylon 6, nylon 6,6, etc. The veils help to improve visual quality, reduce fiber splitting and provide an isolating material in applications where incompatible materials must exist. This approach can be used for decorative appearance parts, structural and/or semi-structural parts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a schematic illustration of several veil layup configurations having plies and one or more veils, in accordance with the present invention.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, the present invention is directed to veils incorporated into pre-impregnated carbon fiber for compression molding processing. At least one veil is positional in any predetermined location of the ply stack layup configuration suitable for providing the desired surface quality and any other desired predetermined properties.

In general, impregnated veils for use in compression molding processing of pre-impregnated carbon fiber pre-impregnated continuous and/or discontinuous thermoset and thermoplastic materials is provided, according to the present invention. These veils are incorporated within the process, e.g., most preferably in the filming or laminating stages, of the pre-pregging (either hotmelt or solvent based processes) in a resin chosen from variety of resins, e.g., resins such as epoxy based, polyurethane, polyester, vynyl ester, nylon 6, nylon 6,6, etc. and combinations thereof, depending on the application. These veils help to improve visual quality, reduce fiber splitting and provide an isolating material in applications where incompatible materials must exist. This approach can be used for decorative appearance parts, structural and/or semi-structural parts.

In general, conventional dry veils are disadvantageous since they may be acceptable for 2D/flat parts, but are not acceptable for 3D contour parts. By contrast, in accordance with the present invention, impregnated veils do not starve resin from the pre-preg and maintains resin distribution. The impregnated veils smooth out the surface (e.g., Class-A surface) and minimize surface defects that force rework of the surface. The impregnated veils also offer potential to improve processing and reduce overall product cost.

Generally, the present invention provides a unique use of existing off-the-shelf veils incorporated into pre-impregnated continuous carbon fiber material for compression molding. The present invention can be applied to continuous and/or discontinuous fibers and thermoset and/or thermoplastic materials. The veil materials are impregnated with the native resin and included into the carbon pre-preg layer, e.g., top of the carbon pre-preg layer. The veil can include polyester, aramid, glass, carbon or other suitable fiber material. Generally, the veil areal weight ranges from 1-100 GSM (grams per square meter). The veil(s) can be located in a single or multiple surfaces within the ply stack depending on the application and/or oriented in any suitable direction.

In one embodiment, there is provided carbon fiber reinforced plastic, and in another embodiment, a polyester veil. More than one veil material, type, dimensions, orientation and location in each stack layup can be used without departing from the scope of the present invention depending on the application.

Figure 1:
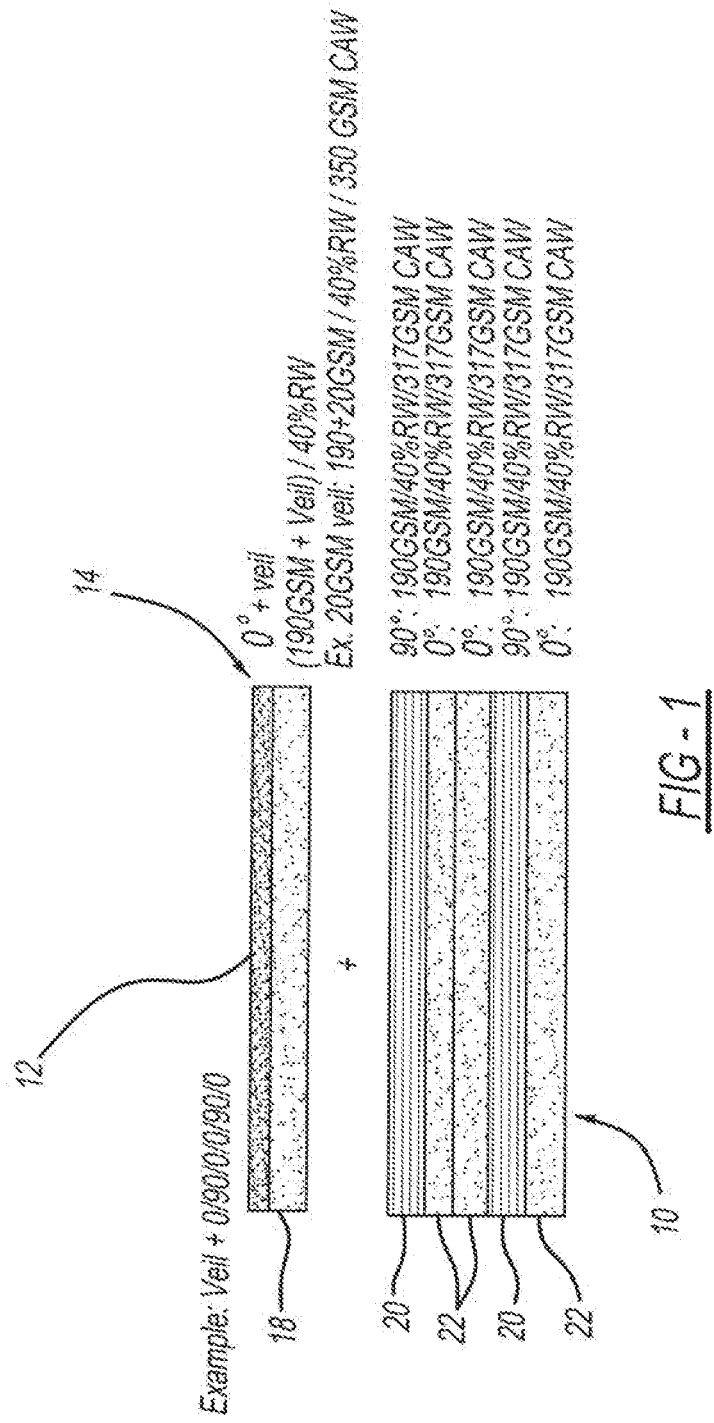
FIG. 1 is a schematic illustration of a ply stack having a veil on a first ply, in accordance with the present invention.

Referring now to FIG. 1 generally, according to one preferred embodiment, there is provided a ply stack indicated generally at 10, which includes at least one impregnated veil 12 operably incorporated into a first ply 18, e.g., top Class-A surface, forming a pre-preg layer generally shown at 14. The first ply 18 is a 0 degree (0°) ply orientation. The ply stack further includes a plurality of additional pre-preg plies (or "sub-plies") with predetermined ply orientations, preferably, with a predetermined alternating or semi-alternating ply orientation pattern. FIG. 1 depicts the sub-plies including a second ply 20 (or second sub-ply) with 90° orientation to the first ply 18 and a third ply 22 (or third sub-ply) with 0° orientation. Additional pre-preg sub-plies are also depicted that have the 0° and 90° orientations 20,22. Thus, in the example set forth in FIG. 1, the ply stack 10 includes the impregnated veil 12 plus 6 plies that are stacked and orientated in the following order: veil/0°/90°/0°/0°/90°/0°. While 6 plies total are illustrated, it is understood that more or less plies could be used depending on the application without departure from the scope of the present invention.

The first ply 18 has resin film adjusted to ensure a total 40% RW (40% resin weight) applied to both the pre-preg and veil 12 to avoid resin starving from the plurality of sub-plies 20,22 stack. Preferably, the resin content is 40%, however, more or less is contemplated depending on the application without departure from the scope of the present invention.

The first ply 18 has a 190 grams per square meter (GSM) fiber areal weight (FAW) and the veil 12 has 20 GSM FAW. However, more or less of either is contemplated depending on the application without departure from the scope of the present invention.

Each of the sub-plies 20,22 (the second ply 20, third ply 22 and remaining 3 sub-plies 20,22) has 190 GSM FAW and 40% RW. However, more or less of either is contemplated depending on the application without departure from the scope of the present invention. In general, "FAW" describes the fiber content of the product). Additionally, each sub-ply 20,22 has a product weight of 317 GSM conditioned areal weight (CAW). However, more or less is contemplated depending on the application without departure from the scope of the present invention. In general, "CAW" is the total resin weight plus fiber areal weight (describes the overall weight of the product, and the unit of measure is typically grams per square meter).

The pre-preg layer 14 has a 40% RW and 350 GSM CAW. However, more or less of either is contemplated depending on the applications without departure from the scope of the present invention.

The veil 12 type/material has predetermined qualities suitable for formulation with the substrate chosen and which provides suitable predetermined desired properties.

A particularly preferred veil type for use in the present invention is an Optiveil™ TFP 20202A (12 gsm or 17 gsm) available from TFP, Schenectady, N.Y. This is a lightweight veil with short-chopped fibers, e.g., fibers are carbon, glass, aramid, polyester, thermoplastic and metal coated carbon, or etc fiber types, and includes an organic binder. The areal weight is generally from 2 to 34 $g/m^2$. Alternatively, the material for use in the present invention is an OCV™ M524-ECR20A (20 GSM) or OCV™ M524-ECR30A (30 gsm) available from Owens Corning®, Toledo, Ohio. These are glass fiber veils bound by a modified acrylic resin. Both include Advantex® having 13μ-18 mm glass fibers. The acrylic resin is compatible with at least polyethylene, polypropylene, epoxy, vinyl ester and polyester resins. M524-ECR20A has an area weight of generally 19-25 $g/m^2$, typically 22 $g/m^2$, a binder content of generally 7-11%, typically 9%, a thickness of generally 0.2-0.26 mm, typically 0.23 mm, and an air permeability (at 100 Pa) of generally 7250-8950 $l/m^2s$, typically 8100 $l/m^2s$. M524-ECR30A has an area weight of generally 27-33 $g/m^2$, typically 30 $g/m^2$, a binder content of generally 9-11%, typically 10%, a thickness of generally 0.29-0.37 mm, typically 0.33 mm, and an air permeability (at 100 Pa) of generally 5670-7040 $l/m^2s$, typically 6400 $l/m^2s$. However, other suitable veil types are contemplated depending on the application without departure from the scope of the present invention.

The veil material can be a polyester with cross-linked styrene acrylic or a glass fiber bound by modified acrylic resin. However, other suitable veil materials are contemplated depending on the application without departure from the scope of the present invention.

Preferably, the resin is an epoxy-based resin system, however, alternative resin systems based in vinyl ester, poly ester, polyurethane or any other suitable resin(s) depending on the applications are contemplated without departure from the scope of the present invention.

The epoxy based resin system includes curing agent(s) or other additive(s) for toughening or for any other desired predetermined properties. During heating, the resin and curing agent(s) initiates the reaction.

Other fillers, additives and components may be included in minor amounts provided they do not affect the desired properties of the present invention.

While carbon fiber pre-impregnated with epoxy material is contemplated, different fibers such as Kevlar, Glass, Bassalt, etc. or resins such as vynyl ester, poly ester, PA6, PA66, etc. could be used depending on the application without departing from the scope of the present invention. Other processes not limited to molding are contemplated for manufacturing of parts. Other materials are also contemplated suitable for manufacturing of the parts. The parts manufactured can be smaller or larger. Flat sheets of material, single or stacked in multiple orientations are contemplated. Flat sheets can be pressed into a 3D shape or contoured. Sheets of material can also be solid, spliced, have localized thickened areas (e.g., extra patches of materials).

It is understood that at least one veil layer can be located in any alternative position and/or a plurality of veil layers are used in multiple locations depending on the application desired predetermined properties and requirements. By way of non-limiting example, there are a plurality of ply layers in a stack, e.g., six or more, and a first veil is located between plies 1 and 2 and a second veil is located between plies 5 and 6 (1 being the cavity/Class-A surface, and 6 being the core/Class-B surface). By way of another non-limiting example, a veil is located substantially in the middle of the stack, e.g., between the top 3 and bottom 3 plies. In this embodiment, a carbon fiber reinforced plastic veil is used. However, any other material is contemplated suitable for the particular application. By way of non-limiting example, the veil material is glass fiber bound by modified acrylic resin, polyester with cross-linked styrene acrylic, carbon, or other etc. In another non-limiting example, one veil is on the top and another veil on the bottom. Another example, there are at least 4 veils and 6 plies; with veil on top and bottom, between plies 1 and 2 and between plies 5 and 6. Any alternative veil layup configurations, e.g., veil(s) positioning within the ply stack, are contemplated without departing from the scope of the invention.

Figure 2:
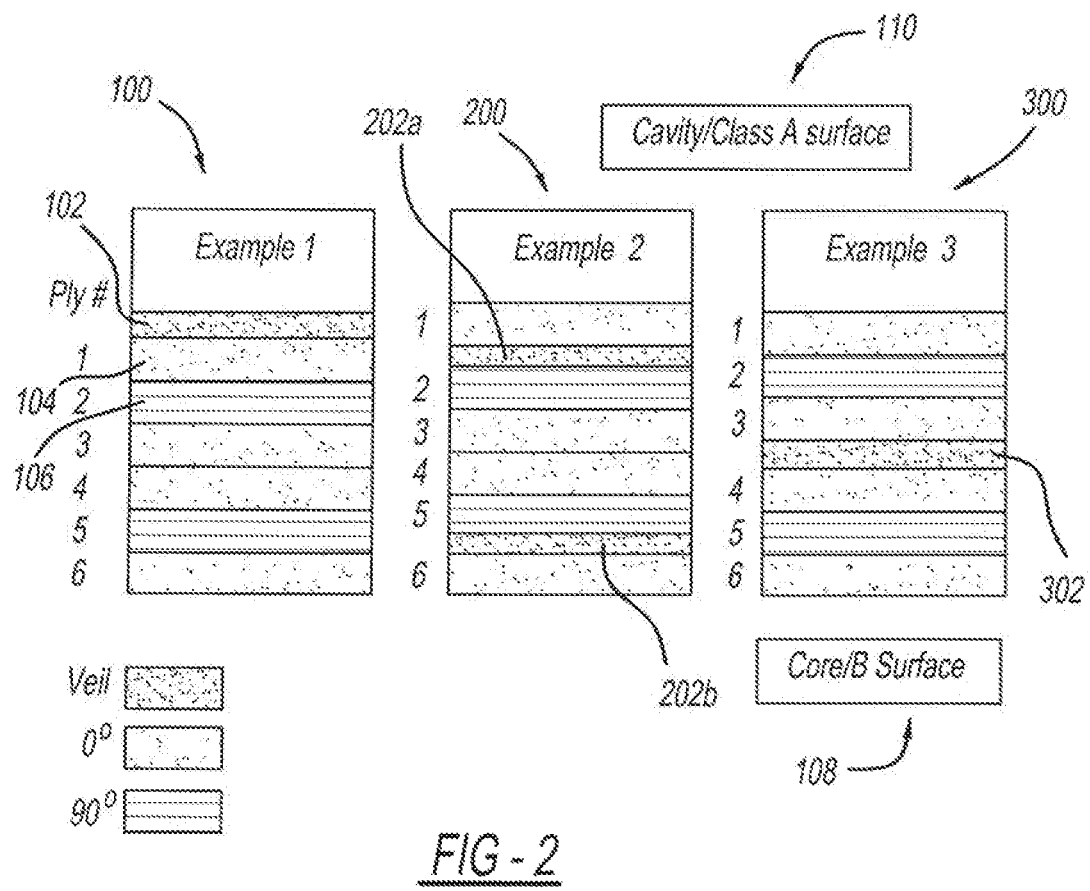
FIG. 2 is a schematic illustration of examples of veil location(s) and ply stack layups, in accordance with the present invention.

Referring now to FIG. 2, there is depicted three examples of ply stacks, according to further embodiments of the present invention. Example 1 illustrates a pre-preg ply stack indicated generally at 100, which includes at least one impregnated veil 102 on the class A surface of the first ply 104 (top ply in the stack 100). The first ply 104 has a 0° orientation. A second ply is below the first ply 104 and has a 90° orientation. The pre-preg sub-plies 3-6 have either 0° or 90° orientations, e.g., such as indicated in the example 1 forming the following: veil/0°/90°/0°/0°/90°/0°. While 6 plies total are illustrated and in the orientations depicted, it is understood that more or less plies and alternative orientations could be used depending on the application without departure from the scope of the present invention.

Example 2 incorporates a plurality of veils; veil on ply no. 2 and ply no 6. The incorporation of additional veils between pre-preg plies, depending on the application, such as in Example 2 for example directly above the bottom ply and directly below the top ply, is effective in anchoring fibers. This results in less fiber movement and a significant improvement in surface quality. Example 2 illustrates the ply stack indicated generally at 200 having at least two veils (a first veil 202a and a second veil 202b). The plies 1-6 have either 0° or 90° orientations, e.g., such as indicated in the example 2 to form the following: 0°/veil/90°/0°/0°/90°/veil/0°. While 6 plies total are illustrated and in the orientations depicted, it is understood that more or less plies and alternative orientations could be used depending on the application without departure from the scope of the present invention.

Example 3 illustrates a central location for the veil with pre-preg layers on either side, which helps to avoid electrostatic issues. Having pre-preg layers on either side also aids in preventing fiber bridging. The ply stack indicated generally at 300 has at least one veil 302 that is substantially centrally located in the stack. The plies 1-6 have either 0° or 90° orientations, e.g., such as indicated in the example 3 for forming the following: 0°/90°/0°/veil/0°/90°/0° stack. While 6 plies total are illustrated and in the orientations depicted, it is understood that more or less plies and alternative orientations could be used depending on the application without departure from the scope of the present invention.

For Examples 1-3, the veil type is TFP 20202A 12 GSM and/or the veil material is polyester with cross-linked styrene acrylic, according to an embodiment of the present invention. Alternatively, the veil type is TFP 20202A 17 GSM and/or the veil material is polyester with cross-linked styrene acrylic, according to another embodiment of the present invention. Alternatively, the veil type is OCR M524-ECR20A 20 GSM and/or the glass fiber bound by modified acrylic resign, according to yet another embodiment of the present invention. Alternatively, the veil type is OCR M524-ECR30A 30 GSM and/or the glass fiber bound by modified acrylic resign, according to yet another embodiment of the present invention. Alternative veil types/materials are contemplated depending on the application without departure from the scope of the present invention.

Preferably, the veils, e.g., 102, 202a, 202b, and/or 302 are suitably incorporated within the process, e.g., most preferably in the filming or laminating stages, of the pre-pregging (either hotmelt or solvent based processes) in the resin, e.g., preferred epoxy based resin.

Further depicted in FIG. 2 is a representation of the core tooling ('B' surface) 108 and the cavity tooling 110 (Class 'A' surface). According to an embodiment of the present invention, a predetermined pre-preg ply stack is provided (e.g., Example 1, 2, 3 or any other predetermined suitable stack) and preformed to a desired shape and placed on the core tooling 108. The cavity tooling 110 closes on the preformed pre-preg blank applying a predetermined clamp force and predetermined tool temperature for a predetermined time to mold the part. Preferably, the part out of the mold is ready for painting. According to the present invention at least a better surface is produced out of the tool that requires less surface preparation and rework to meet Class A requirements, and reduces surface preparation and costs associated therewith. Once prepared for painting, if required, the surface is painted as conventionally known.

Figure 3:
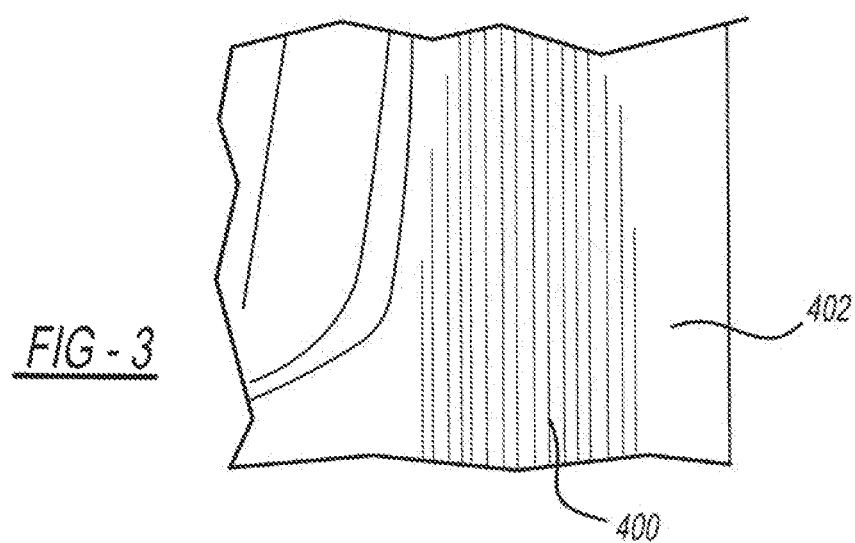
FIG. 3 is a perspective view illustrating fiber bridging on a Class A surface of a part.

FIG. 3 illustrates an example of fiber bridging 400 areas on a Class A surface 402 of a part. This is caused by the pre-preg integrity being low, which allows splits to develop when a clamp force is applied during compression molding. The fiber bridging is most pronounced in areas with curvature or other changes in part geometry. On the top ply (the Class A surface 302) the splits will align with the fibers in the orientation of the ply (e.g., 0° orientation).

FIG. 4 illustrates examples of additional veil layups, according to other embodiments of the present invention. Example 4 includes a veil on the top of the ply stack and incorporates a plurality of veils; there is a veil on the top ply (ply no. 1) and a veil on ply no. 2. Example 5 incorporates a veil on ply no. 2. Example 6 incorporates a plurality of veils (including a veil on the top and a veil on the bottom of the ply stack); there is one veil on ply no. 1, one veil on ply no. 2, one veil on the bottom of ply no. 5, and one veil on the bottom (bottom of ply no. 6), one veil on the bottom of ply no. 5. Example 7 incorporates a plurality of veils (including a veil on the top and a veil on the bottom of the ply stack); there is a veil on ply no. 1 and a veil on the bottom (bottom of ply no. 6).

The veils each include 12 gsm of polyester. By way of example, a resin film is produced and each veil is incorporated into the resin film under predetermined low heat and pressure prior to a carbon fiber prepreg lamination process. These prepreg layers laminated with the polyester are used to produce the kits in the layup configurations depicted in Examples 4-7, for example.

Each ply is orientated either 0 or 90 degrees, as indicated in the tables for Examples 4-7. Each ply at ply orientation 0° has a FAW of about 190 gsm and a RAW of about 125 gsm. Each ply at ply orientation 90° has a FAW of about 190 gsm and a RAW of about 125 gsm. Each veil has a FAW of about 12 gsm and RAW of about 12 gsm. However, more or less GSM, FAW and/or RAW is/are contemplated depending on the application without departure from the scope of the present invention.

The incorporation of additional veils depending on the application will minimize fiber movement and pre-preg splits on the bottom of the part substrate, especially when at least one additional veil is on the bottom or near the bottom plies of the ply stack, e.g., Example 6. This results in significantly minimized or eliminated read through on Class A surfaces. In addition, like depicted in Example 6 for example, depending on the application, additionally incorporating veils on the top or near the top plies of the ply stack provides a more balanced layup. This results in significantly improved integrity of the pre-preg stack, considerably reducing fiber movement and splits in the substrate to minimize the appearance of read through defects.

It is understood that additional layup and veil configurations and ply and veil amounts are contemplated depending on the application without departure from the scope of the present invention.

In another embodiment, a compression molding process is provided, e.g., compression molding of pre-impregnated ("pre-preg") carbon fiber, in which the veil(s) is/are incorporated within the filming stage or laminating stage of the pre-pregging. Typically, either a hotmelt or solvent based process. The pre-pregging is in a variety of resins, e.g., epoxy, polyurethane, polyester, vinyl ester, nylon 6, nylon 6,6 etc.

Preferably, veils are incorporated into the pre-impregnated continuous carbon fiber material for compression molding. Veils can be applied to continuous and/or discontinuous fibers and thermoset and thermoplastic materials. Generally, veil materials are impregnated with the native resin and included into the top of carbon pre-preg layer (or alternative suitable layer(s) depending on the application). The veil can be polyester, glass, carbon or other suitable material. And, generally, the veil areal weight ranges from 1-100 GSM. The veil(s) can be located in multiple surfaces within the ply stack depending on the application or oriented in any suitable direction.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A compression molding process for carbon fiber pre-impregnated materials, comprising:
   providing at least one pre-impregnated first ply;
   providing a plurality of pre-impregnated sub-plies below the first ply, said first ply and sub-plies have a predetermined orientation of either 0° or 90°;
   providing at least one impregnated veil incorporated into a predetermined surface of at least one ply of the pre-impregnated first ply and/or pre-impregnated sub-plies;
   cutting and/or pre-forming the pre-impregnated materials with the at least one impregnated veil to a predetermined shape forming a pre-impregnated blank; and
   compression molding the pre-impregnated blank under predetermined clamping pressure and temperature ranges to form a part;
   wherein the fiber content of the at least one impregnated veil is about 12 to 20 GSM, and the first ply and/or each sub-ply has a fiber areal weight of about 190 GSM;
   wherein the at least one impregnated veil is incorporated into the top surface of the first ply; and
   wherein the conditioned areal weight of the first ply with the impregnated veil is about 350 GSM and the sub-plies are about 317 GSM.

2. The compression molding process of claim 1, wherein the at least one impregnated veil is incorporated during filming or laminating stages of pre-impregnating of the at least one first ply and/or plurality of sub-plies in a resin.

3. The compression molding process of claim 2, wherein the resin is selected from the group consisting of epoxy, polyurethane, polyester, vinyl ester, nylon 6, nylon 6,6 and combinations thereof.

4. The compression molding process of claim 2, wherein the pre-impregnation of the at least one first ply and/or plurality of sub-plies is a hot melt or solvent based process.

5. The compression molding process of claim 1, wherein the at least one impregnated veil has a resin content of about 1 to 100 GSM of resin areal weight.

6. The compression molding process of claim 1, wherein the resin content of the at least one impregnated veil is about 12 to 20 GSM.

7. The compression molding process of claim 1, wherein the at least one impregnated veil and first ply have at least about a 40% resin weight, wherein the resin weight prevents resin starving from the sub-plies.

8. The compression molding process of claim 1, wherein there are at least two impregnated veils incorporated into different surfaces of the first ply and/or sub-plies at predetermined locations.

9. The compression molding process of claim 8, wherein one of the impregnated veils is located between the first ply and a second ply, and another of the impregnated veils is located between a bottom ply and the ply above the bottom ply.

10. The compression molding process of claim 1, wherein the at least one impregnated veil is incorporated into the bottom surface of a bottom ply, is centrally located, and/or includes at least one other impregnated veil incorporated at another location(s) in the ply stack.

* * * * *